United States Patent
Ratajac

(10) Patent No.: US 10,787,922 B2
(45) Date of Patent: Sep. 29, 2020

(54) TUBULAR SEAL WITH WAVY SHROUD FOR AN AIRCRAFT PROPULSION SYSTEM

(71) Applicant: Rohr, Inc., Chula Vista, CA (US)

(72) Inventor: Aleksandar Ratajac, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 66 days.

(21) Appl. No.: 15/969,086

(22) Filed: May 2, 2018

(65) Prior Publication Data
US 2019/0338662 A1 Nov. 7, 2019

(51) Int. Cl.
*F16J 15/02* (2006.01)
*F01D 11/00* (2006.01)

(52) U.S. Cl.
CPC .......... *F01D 11/005* (2013.01); *F16J 15/027* (2013.01); *F05D 2220/323* (2013.01); *F05D 2240/55* (2013.01)

(58) Field of Classification Search
CPC ............ F01D 11/005; F05D 2220/323; F05D 2240/55; F16J 15/027; F16J 15/46
See application file for complete search history.

(56) References Cited

U.S. PATENT DOCUMENTS

| | | | |
|---|---|---|---|
| 5,910,094 A | 6/1999 | Kraft et al. | |
| 6,161,839 A * | 12/2000 | Walton | F01D 17/105 |
| | | | 277/345 |
| 8,936,249 B2 * | 1/2015 | Swensen | F16J 15/0893 |
| | | | 277/646 |
| 2015/0266563 A1 * | 9/2015 | Zeon | B64C 1/38 |
| | | | 244/130 |
| 2018/0298826 A1 * | 10/2018 | Sandiford | B64D 33/04 |

* cited by examiner

*Primary Examiner* — Gilbert Y Lee
(74) *Attorney, Agent, or Firm* — Getz Balich LLC

(57) ABSTRACT

An assembly is provided for an aircraft propulsion system. This assembly includes a first component, a second component and a tubular fire seal. The first component includes a first passage. The second component includes a second passage. The tubular fire seal seals a gap between the first component and the second component. The tubular fire seal includes an outer shroud. At least a portion of the outer shroud has a wavy sectional geometry. The first passage is fluidly coupled with the second passage through an inner bore of the tubular fire seal.

20 Claims, 7 Drawing Sheets

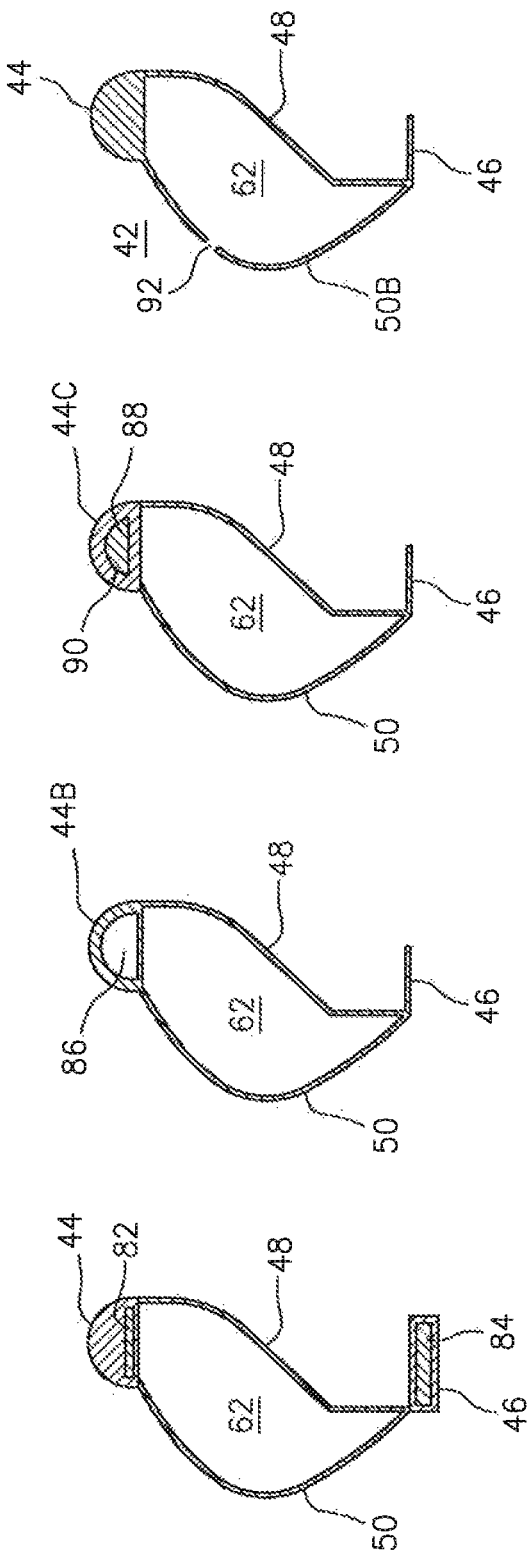

TUBULAR SEAL WITH WAVY SHROUD FOR AN AIRCRAFT PROPULSION SYSTEM

BACKGROUND

1. Technical Field

This disclosure relates generally to an aircraft propulsion system and, more particularly, to a seal with an outer shroud.

2. Background Information

Various types and configurations of seals are known in the art for sealing a gap between components of an aircraft propulsion system. While these known seals have various benefits, there is still room in the art for improvement.

SUMMARY OF THE DISCLOSURE

According to an aspect of the present disclosure, a seal is provided that includes a body made of a flexible yet non-stretchable material having a hollow tubular shape formed into a closed loop defining an axis. The closed loop has an elongated shape. The body includes a first axial portion, a second axial portion, a first radial wall and a second radial wall. The first axial portion is on a first axial end of the body. The second axial portion is on a second axial end of the body. The first radial wall is connected between the first axial portion and the second axial portion. The second radial wall is connected between the first axial portion and the second axial portion. A perimetrical length of the second radial wall is operable to redistribute along the elongated shape such that the first axial portion and the second axial portion remain flat when a height of the body is axially compressed between two planar surfaces at least fifteen percent.

According to another aspect of the present disclosure, an assembly is provided for an aircraft propulsion system. This assembly includes a first component of the aircraft propulsion system, a second component of the aircraft propulsion system, and a tubular fire seal. The first component includes a first passage. The second component includes a second passage. The tubular fire seal seals a gap between the first component and the second component. The tubular fire seal includes an outer shroud. At least a portion of the outer shroud has a wavy sectional geometry. The first passage is fluidly coupled with the second passage through an inner bore of the tubular fire seal.

According to another aspect of the present disclosure, another assembly is provided for an aircraft propulsion system. This assembly includes a first component of the aircraft propulsion system, a second component of the aircraft propulsion system, and a tubular fire seal. The first component includes a first passage. The second component includes a second passage. The tubular fire seal seals a gap between the first component and the second component. The tubular fire seal includes an outer shroud. The outer shroud includes an outer surface configured with a first convex portion, a second convex portion, a first concave portion and a second concave portion. The first convex portion and the first concave portion are located on a first side of the outer shroud. The second convex portion and the second concave portion are located on a second side of the outer shroud that is opposite the first side. The first passage is fluidly coupled with the second passage through an inner bore of the tubular fire seal.

According to still another aspect of the present disclosure, another assembly is provided for an aircraft propulsion system. This assembly includes a seal including a ring seal bulb, a tubular inner member, a tubular outer shroud and a ring flange. The tubular inner member and the tubular outer shroud extend along a centerline between and are connected to the ring seal bulb and the ring flange. The tubular outer shroud is spaced out from and circumscribes the tubular inner member. An outer surface of the tubular outer shroud is configured with a convex portion and a concave portion when viewed in a plane perpendicular to the centerline. An inner bore extends along the centerline through the seal. The inner bore is formed by the ring seal bulb, the tubular inner shroud and the ring flange.

The perimetrical length of the second radial wall may be operable to redistribute along the elongated shape such that the first axial portion and the second axial portion remain flat when the height of the body is axially compressed between the two planar surfaces at least forty percent.

The perimetrical length of the second radial wall may be operable to redistribute along the elongated shape such that the first axial portion and the second axial portion remain flat when the height of the body is axially compressed between the two planar surfaces at least sixty percent.

At least a portion of the second radial wall may have a wavy sectional geometry.

The wavy sectional geometry may be viewed in a plane perpendicular to the axis.

The second radial wall may include an outer surface configured with a convex portion and a concave portion.

The convex portion may be adjacent the concave portion.

The convex portion may run into the concave portion.

The concave portion and the convex portion are located on a first side of the second radial wall.

The outer surface may be further configured with a second concave portion and a second convex portion. The second concave portion and the second convex portion may be located on a second side of the second radial wall that is diametrically opposed to the first side.

The second radial wall may be configured with a long side and a short side. The long side may include the first side.

The outer surface may be further configured with a second convex portion. The concave portion may be adjacent and between the convex portion and the second convex portion.

The outer surface may be further configured with a second concave portion. The convex portion may be adjacent and between the concave portion and the second concave portion.

The body may be configured as a single, monolithic body.

The body may be configured as or otherwise include a tubular fire seal.

The body may be configured as or otherwise include fiber-reinforced polymeric material.

The assembly may include a first component of the aircraft propulsion system and a second component of the aircraft propulsion system. The first component may include a first passage. The second component may include a second passage. The ring seal bulb may engage the first component. The ring flange may be mounted to the second component. The first passage may be fluidly coupled with the second passage through the inner bore.

The inner bore may extend along a centerline through the tubular fire seal. The wavy sectional geometry may be viewed in a plane perpendicular to the centerline.

The outer shroud may include an outer surface configured with a convex portion and a concave portion.

The convex portion may be adjacent the concave portion.

The convex portion may run into the concave portion.

The concave portion and the convex portion may be located on a first side of the outer shroud.

The outer surface may be further configured with a second concave portion and a second convex portion. The second concave portion and the second convex portion may be located on a second side of the outer shroud that is diametrically opposed to the first side.

The shroud may be configured with a long side and a short side. The long side may include the first side.

The outer surface may be further configured with a second convex portion. The concave portion may be adjacent and between the convex portion and the second convex portion.

The outer surface may be further configured with a second concave portion. The convex portion may be adjacent and between the concave portion and the second concave portion.

The inner bore may be configured with an elongated cross-sectional geometry having a minor axis and a major axis.

The tubular fire seal may further include a seal bulb and an inner member. The seal bulb may axially engage the first component. The inner member and the outer shroud may project out from the seal bulb towards the second member. The outer shroud may circumscribe the inner member.

The tubular fire seal may further include a base mounted to the second component. The outer shroud and the inner member may extend between and may be connected to the seal bulb and the base.

The tubular fire seal may be configured as a single, monolithic body.

A cavity may be formed laterally between the inner member and the outer shroud.

The tubular fire seal may be configured as a single, monolithic body. The tubular fire seal may be configured from or otherwise include fiber-reinforced polymeric material.

The outer shroud may be constructed from material that is operable to flex but not stretch.

The foregoing features and the operation of the invention will become more apparent in light of the following description and the accompanying drawings.

BRIEF DESCRIPTION OF THE DRAWINGS

FIG. 12 is a side-sectional illustration of the tubular seal configured with backbones, and accordance with various embodiments; and FIGS. 13-15 are side-sectional illustrations of alternative tubular seal configurations, in accordance with various embodiments.

DETAILED DESCRIPTION

Figure 1:
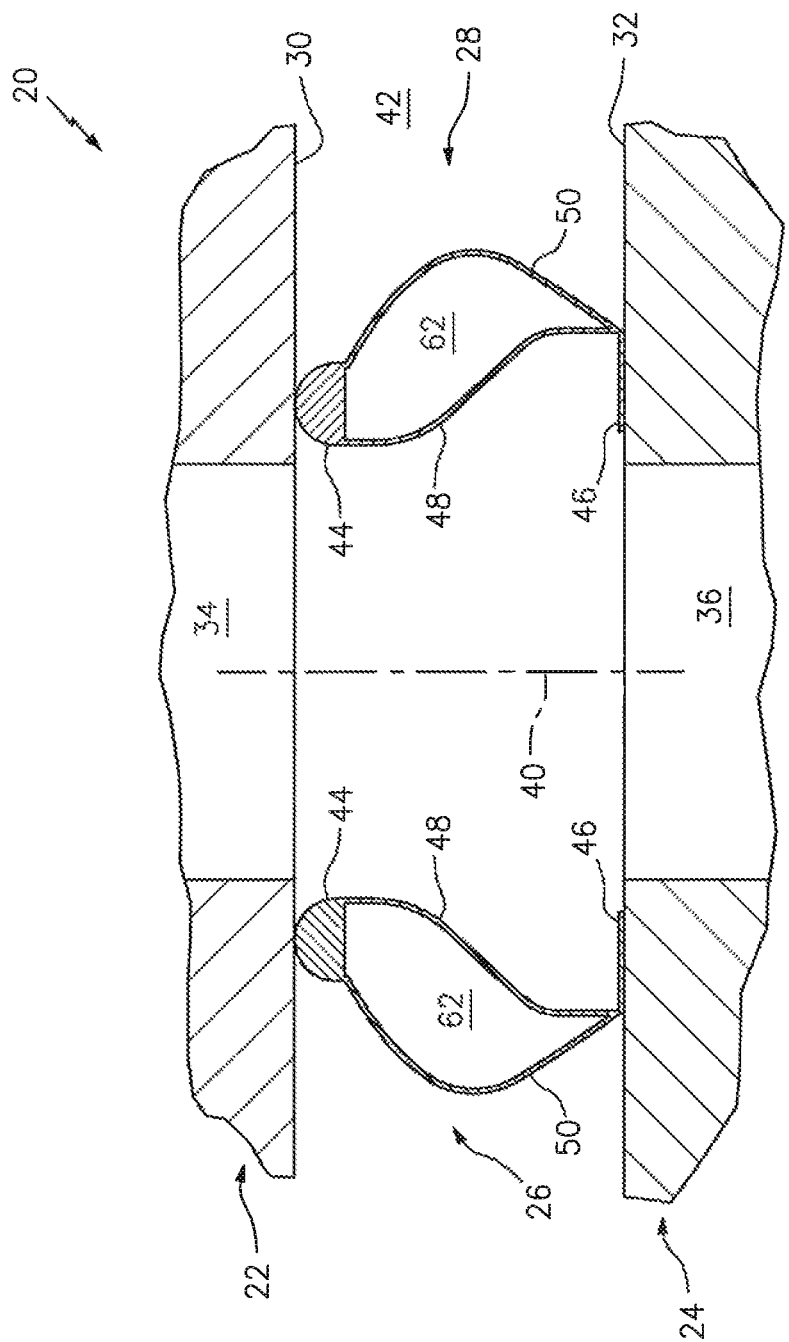
FIG. 1 is a schematic side-sectional illustration of an assembly for an aircraft propulsion system, in accordance with various embodiments.

FIG. 1 is a schematic side-sectional illustration of an assembly 20 for an aircraft propulsion system. Examples of such an aircraft propulsion system include, but are not limited to, a turbofan propulsion system and a turbojet propulsion system.

The assembly 20 of FIG. 1 includes a first component 22 of the aircraft propulsion system, a second component 24 of the aircraft propulsion system and a tubular seal 26 such as, but not limited to, a tubular fire seal. This tubular seal 26 is configured to substantially seal a gap 28 between opposing surfaces 30 and 32 of the respective first and second components 22 and 24.

The first component 22 is configured with a first passage 34; e.g., a fluid flow passage such as an airflow passage. This first passage 34 extends into the first component 22 from its first component surface 30. An example of the first component 22 is a thrust reverser component and/or a fan duct component. However, the present disclosure is not limited to such an exemplary first component configuration.

The second component 24 is configured with a second passage 36; e.g., a fluid flow passage such as an airflow passage. This second passage 36 extends into the second component 24 from its second component surface 32. An example of the second component 24 is a gas turbine engine structure. However, the present disclosure is not limited to such an exemplary second component configuration.

The tubular seal 26 is arranged between the first component 22 and the second component 24. This tubular seal 26 includes an inner bore 38, which extends completely through the tubular seal 26 along an axial centerline 40 of the seal 26. The inner bore 38 fluidly couples the first passage 34 with the second passage 36. The tubular seal 26 may thereby facilitate flow of fluid such as air between the first passage 34 and the second passage 36 through the inner bore 38, while mitigating or preventing leakage between an exterior plenum 42 and the passages 34 and 36.

Figure 2:
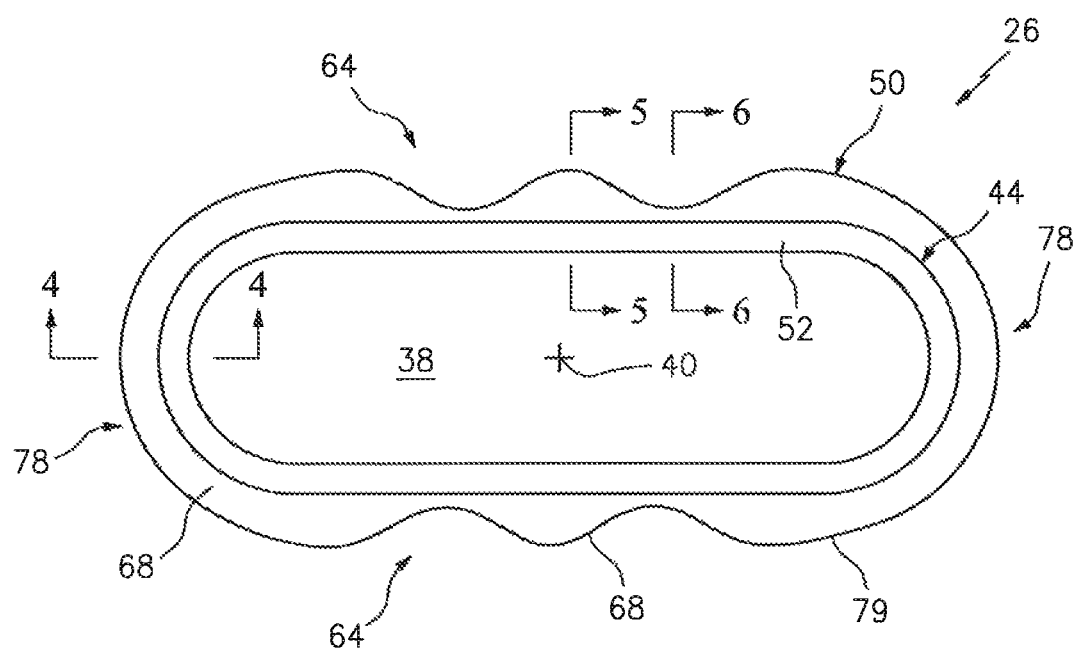
FIG. 2 is a top view illustration of a tubular seal in an uncompressed condition, in accordance with various embodiments.
Figure 3:
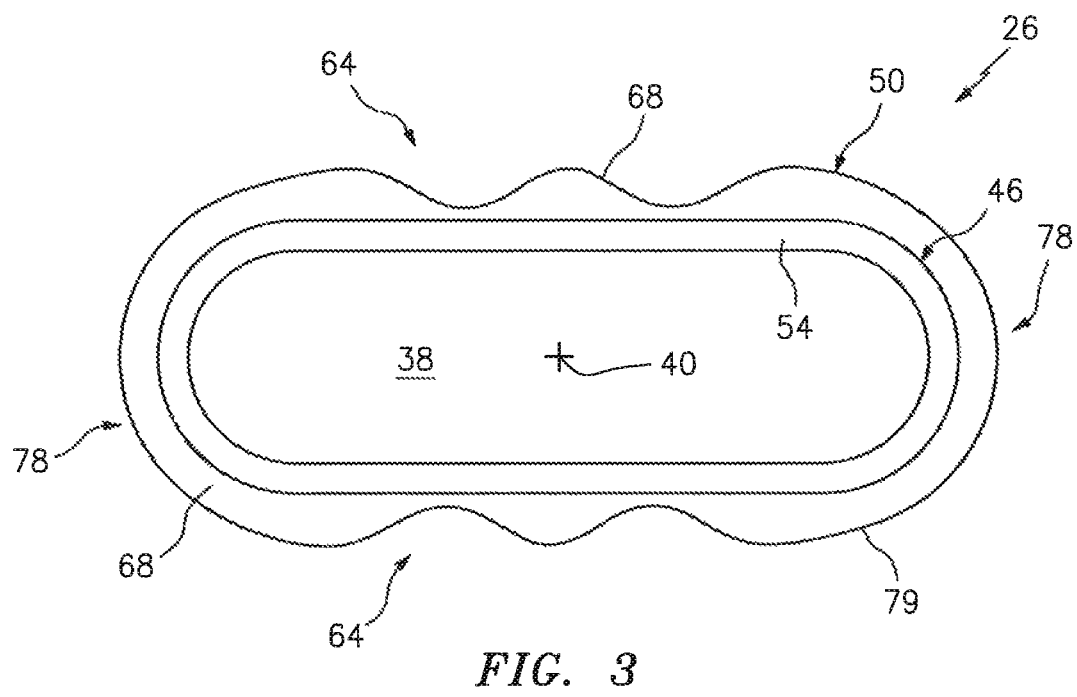
FIG. 3 is a bottom view illustration of the tubular seal in the uncompressed condition, in accordance with various embodiments.
Figure 4:
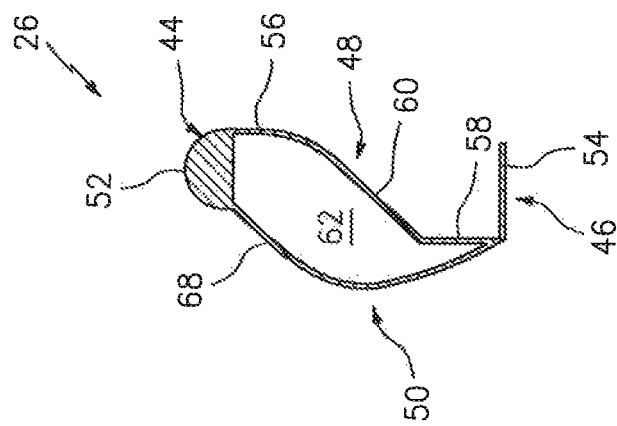
FIG. 4 is a side-sectional illustration of the tubular seal taken along line 4-4 in FIG. 2, in accordance with various embodiments.
Figure 5:
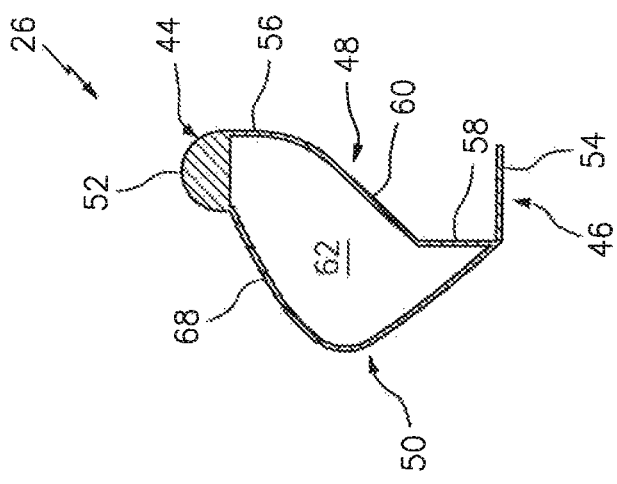
FIG. 5 is a side-sectional illustration of the tubular seal taken along line 5-5 in FIG. 2, in accordance with various embodiments.
Figure 6:
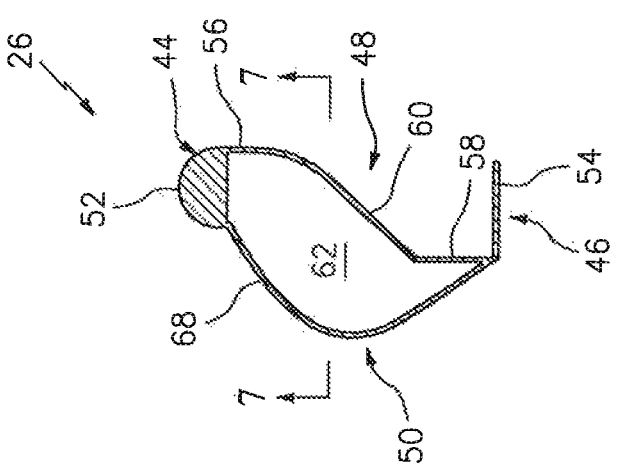
FIG. 6 is a side-sectional illustration of the tubular seal taken along line 6-6 in FIG. 2, in accordance with various embodiments.

Referring to FIGS. 2-6, the tubular seal 26 has a body, which may be made from a flexible yet non-stretchable (e.g., non-elastic) material having a hollow tubular shaped formed into a closed loop defining an axis (e.g., the centerline 40). The closed loop has an elongated shape; e.g., a racetrack shape, an oval shape, etc. The tubular seal 26 and its body includes a first axial portion such as a seal bulb 44 (not visible in FIG. 3), a second axial portion such as a base 46 (not visible in FIG. 2), a first radial wall such as an inner member 48 (not visible in FIGS. 2 and 3) and a second radial wall such as an outer shroud 50, Referring to FIGS. 2 and 4-6, the seal bulb 44 is located at a first axial end 52 of the tubular seal 26 and its body. The seal bulb 44 of FIG. 2 is configured as a ring seal bulb. The seal bulb 44 of FIG. 2, for example, has a ring-shaped (e.g., annular) geometry when viewed in a plane perpendicular to the centerline 40. Note, the term "annular" is used herein to describe a body that forms a ring, which ring may have an oval, racetrack or other shape. The seal bulb 44 may have a partially circular (e.g., semi-circular) side-sectional geometry as shown in FIGS. 4-6. However, the present disclosure is not limited to such an exemplary seal bulb configuration.

Referring to FIGS. 3-6, the base 46 is located at a second axial end 54 of the tubular seal 26 and its body. This second axial end 54 is opposite the first axial end 52 along the centerline 40. The base 46 of FIG. 3 is configured as a ring-shaped (e.g., annular) mount and, more particularly, as a ring flange. The base 46 of FIG. 3, for example, has a ring-shaped geometry when view in a plane perpendicular to the centerline 40. The base 46 may be cantilevered inwards as shown in FIGS. 4-6 such that its radial outer end is supported by the inner member 48 and/or the outer shroud 50 and its radial inner end is unsupported.

Figure 7:
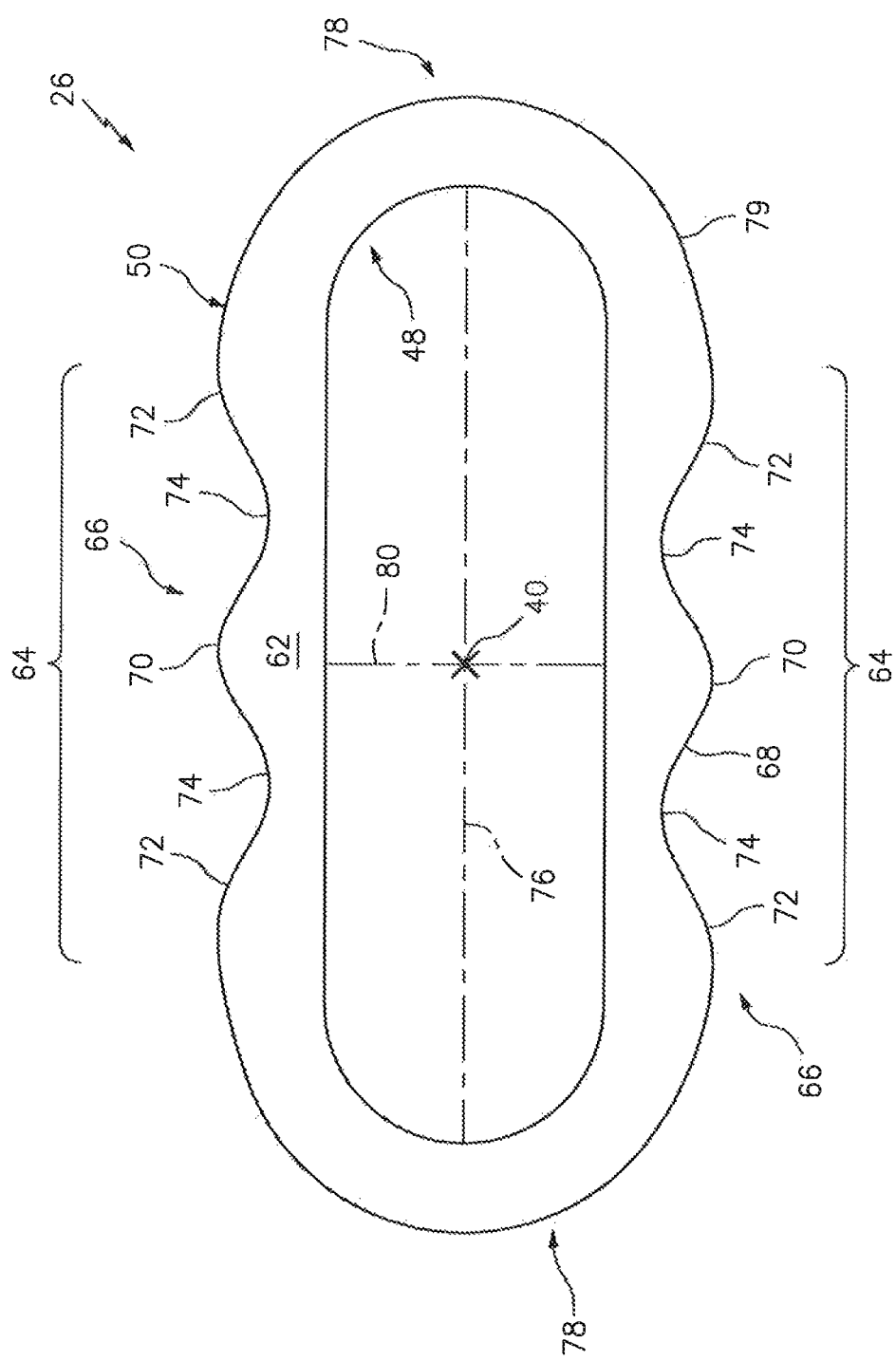
FIG. 7 is a cross-sectional illustration of the tubular seal taken along line 7-7 in FIG. 4, in accordance with various embodiments.

Referring to FIGS. 2 and 4-6, the inner member 48 is located axially between the seal bulb 44 and the base 46. More particularly, the inner member 48 extends axially along the centerline 40 between and is connected (e.g., directly) to the seal bulb 44 and the base 46. With this configuration, the inner member 48 along with the seal bulb 44 and the base 46 form the inner bore 38 of the tubular seal 26. Referring to FIG. 7, the inner member 48 may have a (e.g., non-wavy) ring-shaped (e.g., race-track shaped) cross-sectional geometry when viewed in a plane perpendicular to the centerline 40.

Referring to FIGS. 4-6, the inner member 48 may have a convoluted (e.g., S-/zig-zagged shaped) side sectional geometry when viewed in a plane parallel to the centerline 40. For example, the inner member 48 of FIGS. 4-6 includes a first end portion 56, a second end portion 58 and an intermediate portion 60. The first end portion 56 is connected to the seal bulb 44 at an inner side thereof, and may project substantially axially out from the seal bulb 44 towards the base 46. The second end portion 58 is connected to the base 46 at an outer side thereof, and may project substantially axially out from the base 46 towards the seal bulb 44. The intermediate portion 60 extends (e.g., diagonally) between and is connected to proximal ends of the first end portion 56 and the second end portion 58.

Referring to FIGS. 2-6, the outer shroud 50 is located axially between the seal bulb 44 and the base 46. More particularly, the outer shroud 50 extends axially along the centerline 40 between the seal bulb 44 and the base 46 such that the outer shroud 50 extends from the seal bulb to the base 46. The outer shroud 50 is connected (e.g., directly) to the seal bulb 44 and the base 46. Referring to FIGS. 4-7, the outer shroud 50 is positioned outboard of and spaced outward from the inner member 48 such that the outer shroud 50 circumscribes the inner member 48 and forms a ring-shaped (e.g., annular) inner seal cavity 62 (e.g., plenum) laterally between the outer shroud 50 and the inner member 48.

Referring to FIG. 7, the outer shroud 50 has a ring-shaped (e.g., annular) cross-sectional geometry when viewed in a plane perpendicular to the centerline 40. At least a portion of this cross-sectional geometry is wavy. The geometry shown in FIG. 7, for example, includes a pair of wavy portions 64. These wavy portions 64 are located on opposing (e.g., diametrically opposed) first sides 66 of the outer shroud 50. Each of the wavy portions 64 includes, and thereby provides an outer surface 68 of the outer shroud 50 with, one or more convex portions (e.g., peaks) and one or more concave portions (e.g., troughs). In the specific embodiment of FIG. 7, each wavy portion 64 includes a central convex portion 70, a pair of end convex portions 72 and a pair of concave portions 74. Each of the concave portions 74 is located adjacent and runs into (e.g., extends towards, meets and is connected to) the central convex portion 70 and a respective one of the end convex portions 72. Each wavy portion of FIG. 7 thereby has a back-and-forth undulating cross-sectional geometry.

In the embodiment of FIG. 7, the opposing first sides 66 of the outer shroud 50 are configured as long sides of the outer shroud 50, These long sides 66 may also be referred to as "major axis" sides as each long side 66 extends generally along a major axis 76 of an elongated (e.g., race-track shaped, oval, elliptical, etc.) cross-sectional geometry of the inner bore 38 as shown in FIG. 7. The long sides 66 are joined at their longitudinal ends by a pair of short sides 78. These short sides 78 may also be referred to as "minor axis" sides as each short side 78 extends generally along a minor axis 80 of the elongated cross-sectional geometry of the inner bore 38. Each of the short sides 78 forms an arcuate (e.g., semi-circular) portion of the cross-sectional geometry.

Referring to FIGS. 4-6, the outer shroud 50 may have an arcuate (e.g., partially elliptical, oval or circular) side sectional geometry when viewed in a plane parallel to the centerline 40. The outer surface 68 of the outer shroud 50 of FIGS. 4-6, for example, is convex and bows away from the inner member 48 as the surface 68 extends between the seal bulb 44 and the base 46. It is worth noting, a curvature of the outer surface 68 and, thus, the outer shroud 50 changes depending upon the location about the centerline 40 as exemplified by FIGS. 4-6 in conjunction with FIG. 2. This change in curvature is a result of the wavy cross-sectional geometry of the long side 66 portions.

Referring to FIG. 1, the seal bulb 44 is arranged to axially engage (e.g., press against) the first component surface 30. However, the seal bulb 44 may not be fixedly attached to the first component 22 so as to allow the tubular seal 26 to disengage the first component 22 during select circumstances. The base 46 is arranged to axially engage (e.g., contact) the second component surface 32 and is mounted (e.g., mechanically fastened, adhered, bonded or otherwise attached) to the second component 24.

Figure 10:
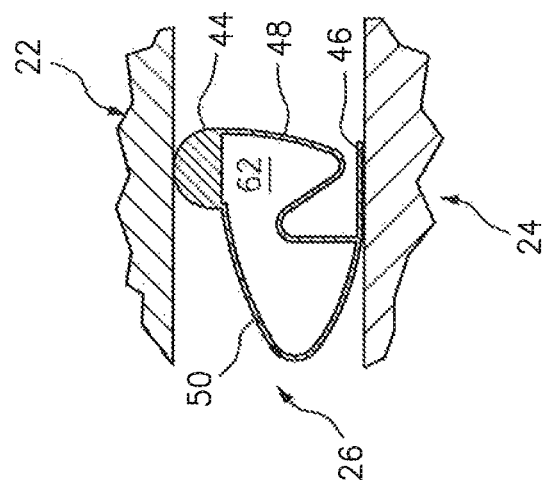
FIG. 10 is a side-sectional illustration of the tubular seal at the select location while in a fully-compressed condition, in accordance with various embodiments.
Figure 9:
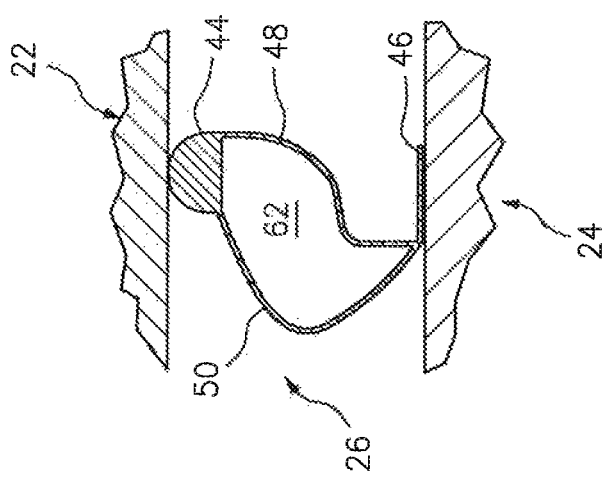
FIG. 9 is a side-sectional illustration of the tubular seal at the select location while in a semi-compressed condition, in accordance with various embodiments.
Figure 8:
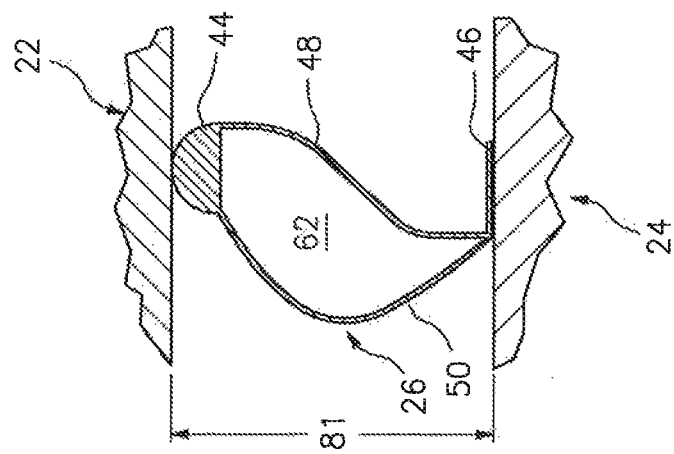
FIG. 8 is a side-sectional illustration of the tubular seal at a select location while in the uncompressed condition, in accordance with various embodiments.
Figure 11:
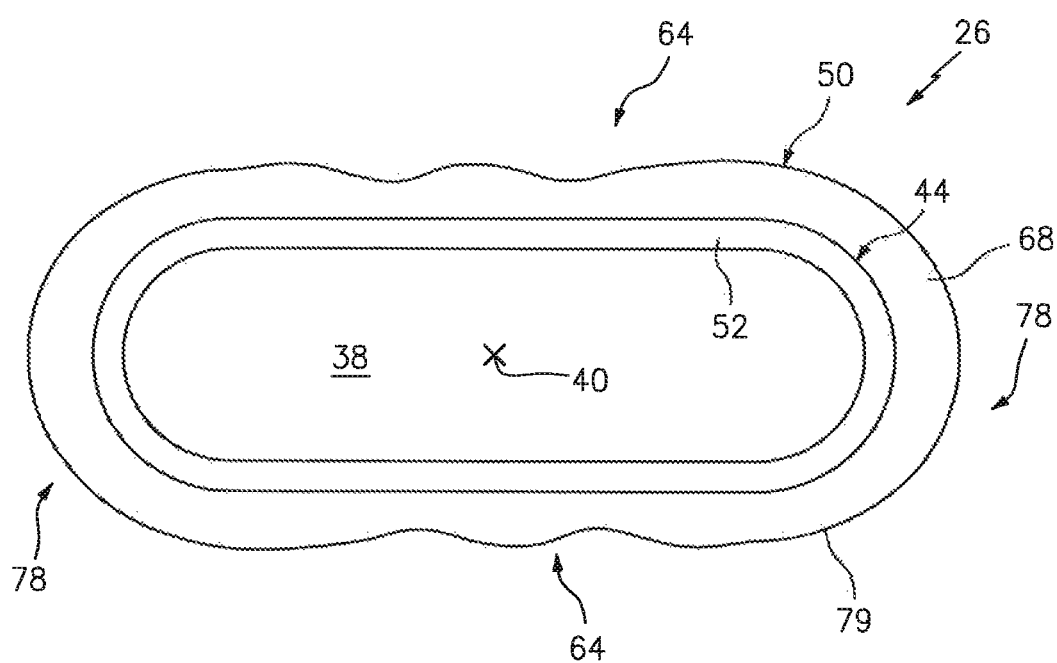
FIG. 11 is a top view illustration of the tubular seal in the fully compressed condition, in accordance with various embodiments.

During operation of the propulsion system, the first component 22 and the second component 24 may shift relative to one another. For example, the axial gap 28 (relative to the centerline 40) may increase and decrease due to propulsion system vibrations, etc. Referring to FIGS. 8-10, as the axial gap 28 changes and the tubular seal 26 is axially compressed, the inner member 48 and the outer shroud 50 deform so as to accommodate the change while maintaining a seal between the first and the second components 22 and 24. This deformation occurs in a plane parallel to the centerline 40 as exemplified in FIGS. 8-10. The deformation also occurs in a plane perpendicular to the centerline 40 as exemplified in FIGS. 2 and 11. Notably, material that forms the wavy long side portions 64 of the outer shroud 50 in FIG. 2 is displaced as shown in FIG. 11 such that the short side 78 portions can expand radially outward without wrinkling. More particularly, a perimetrical length 79 of the outer shroud 50 and its outer surface 68 redistributes along the elongated shape of the seal 26 such that the seal bulb 44 and the base 46 remain flat against the bodies 22 and 24 even where an axial height 81 (see FIG. 8) of the seal 26 is compressed, for example, at least fifteen, twenty, thirty, forty, fifty, sixty or seventy percent (e.g., ≥15-70%). By contrast, if the wavy long side portions were omitted (e.g., substantially straight), the short side portions can wrinkle when a height 81 of that tubular seal is axially compressed at least fifteen percent. Such wrinkling may lead to seal leakage and/or seal deterioration. This is particularly true where the tubular seal is constructed from material that can flex, but cannot stretch.

In some embodiments, the tubular seal 26 may be configured as a monolithic body. Herein, the term "monolithic" may describe an object which is configured as a single unitary body. The components 44, 46, 48 and/or 50 of the tubular seal 26, for example, may be laid-up and cured, cast, injection molded and/or otherwise formed integral with one another. Alternatively, some or all of the tubular seal components 44, 46, 48 and/or 50 may be formed as discrete bodies and, subsequently, fused, bonded, adhered or otherwise fixedly and/or permanently attached to one another without requiring fasteners. Such a monolithic body is in contrast to a multi-piece body that includes multiple components mechanically fastened together, for example, by fasteners and/or interference fits.

In some embodiments, the tubular seal 26 is constructed from or otherwise includes material operable to flex, but not stretch. For example, the tubular seal 26 may be constructed from fiber-reinforcement within a resin matrix. Examples of fiber-reinforcement include, but are not limited to, fiberglass fibers, carbon fibers, aramid (e.g., Kevlar®) fibers, Norex® fibers, Nextel® fibers, or a combination of two or more of the foregoing types of fibers. A non-limiting example of a resin matrix is silicon. In some embodiments, the tubular seal 26 may also include one or more frames configured with (e.g., embedded within) the resin matrix. For example, the seal bulb 44 and the base 46 may each include a metal backbone 82, 84 to maintain is lateral plane shape as shown in FIG. 12.

In some embodiments, the seal bulb 44 may have a solid sectional geometry as shown in FIG. 4. In other embodiments, the seal bulb 44B may have a hollow sectional geometry as shown in FIG. 13. In such embodiments, the seal bulb 44B has a ring-shaped (e.g., annular) inner cavity 86 that extends longitudinally through the seal bulb 44B about the centerline. While this inner cavity 86 is hollow (unfilled) in the embodiment of FIG. 13, in other embodiments the inner cavity of the seal bulb 44C may be filled with another material 88 that is different from the material 90 forming the seal bulb sidewall as shown in FIG. 14.

In some embodiments, the outer shroud 50B may be configured with at least one aperture 92 as shown in FIG. 15. This aperture 92 provides a flow path between the inner seal cavity 62 and the exterior plenum 42.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A seal, comprising:
   a body made of a flexible yet non-stretchable material having a hollow tubular shape formed into a closed loop defining an axial centerline of the body, the closed loop having an elongated shape when viewed in a plane perpendicular to the axial centerline, and the body comprising:
   a first axial portion on a first axial end of the body;
   a second axial portion on a second axial end of the body;
   a first radial wall connected between the first axial portion and the second axial portion, the first radial wall having a first sectional geometry when viewed in the plane perpendicular to the axial centerline, and the first sectional geometry having a first shape when viewed in the plane perpendicular to the axial centerline; and
   a second radial wall connected between the first axial portion and the second axial portion, the second radial wall having a second sectional geometry when viewed in the plane perpendicular to the axial centerline, and the second sectional geometry having a second shape when viewed in the plane perpendicular to the axial centerline that is different than the first shape;
   wherein a perimetrical length of the second radial wall is operable to redistribute along the elongated shape such that the first axial portion and the second axial portion remain flat when a height of the body is axially compressed between two planar surfaces at least fifteen percent.

2. The seal of claim 1, wherein the perimetrical length of the second radial wall is operable to redistribute along the elongated shape such that the first axial portion and the second axial portion remain flat when the height of the body is axially compressed between the two planar surfaces at least forty percent.

3. The seal of claim 1, wherein the perimetrical length of the second radial wall is operable to redistribute along the elongated shape such that the first axial portion and the second axial portion remain flat when the height of the body is axially compressed between the two planar surfaces at least sixty percent.

4. The seal of claim 1, wherein
   the first sectional geometry is non-wavy; and
   at least a portion of the second sectional geometry is wavy.

5. The seal of claim 1, wherein the second radial wall comprises an outer surface configured with a convex portion and a concave portion.

6. The seal of claim 5, wherein the convex portion is adjacent the concave portion.

7. The seal of claim 5, wherein the convex portion runs into the concave portion.

8. The seal of claim 5, wherein the concave portion and the convex portion are located on a first side of the second radial wall.

9. The seal of claim 8, wherein
   the outer surface is further configured with a second concave portion and a second convex portion; and
   the second concave portion and the second convex portion are located on a second side of the second radial wall that is diametrically opposed to the first side.

10. The seal of claim 8, wherein
    the second radial wall is configured with a long side and a short side; and
    the long side comprises the first side.

11. The seal of claim 5, wherein
the outer surface is further configured with a second convex portion; and
the concave portion is adjacent and between the convex portion and the second convex portion.

12. The seal of claim 5, wherein
the outer surface is further configured with a second concave portion; and
the convex portion is adjacent and between the concave portion and the second concave portion.

13. The seal of claim 1, wherein the body is configured as a single, monolithic body.

14. The seal of claim 1, wherein the body comprises a tubular fire seal.

15. The seal of claim 1, wherein the body comprises fiber-reinforced polymeric material.

16. An assembly for an aircraft propulsion system, comprising:
a first component of the aircraft propulsion system including a first passage;
a second component of the aircraft propulsion system including a second passage; and
a tubular fire seal extending circumferentially around an axial centerline of the tubular fire seal, the tubular fire seal sealing a gap between the first component and the second component, the tubular fire seal comprising an outer shroud;
the outer shroud comprising an outer surface configured with, when viewed in a plane perpendicular to the axial centerline, a first convex portion, a second convex portion, a first concave portion and a second concave portion;
the first convex portion and the first concave portion located on a first side of the outer shroud; and
the second convex portion and the second concave portion located on a second side of the outer shroud that is opposite the first side;
wherein the first passage is fluidly coupled with the second passage through an inner bore of the tubular fire seal.

17. An assembly for an aircraft propulsion system, comprising:
a seal comprising a ring seal bulb, a tubular inner member, a tubular outer shroud and a ring flange;
the tubular inner member and the tubular outer shroud extending along a centerline of the seal between and connected to the ring seal bulb and the ring flange;
the tubular outer shroud spaced out from and circumscribing the tubular inner member;
wherein an outer surface of the tubular outer shroud is configured with, when viewed in a plane perpendicular to the centerline, a convex portion and a concave portion; and
wherein an inner bore extends along the centerline through the seal, and is formed by the ring seal bulb, the tubular inner shroud and the ring flange.

18. The assembly of claim 17, further comprising:
a first component of the aircraft propulsion system including a first passage;
a second component of the aircraft propulsion system including a second passage;
wherein the ring seal bulb engages the first component;
wherein the ring flange is mounted to the second component; and
wherein the first passage is fluidly coupled with the second passage through the inner bore.

19. The assembly of claim 17, wherein the seal is configured as a single, monolithic body.

20. The assembly of claim 17, wherein
the tubular inner member has a first sectional geometry when viewed in the plane perpendicular to the centerline, and a first elongated portion of the first sectional geometry has a linear, non-wavy shape when viewed in the plane perpendicular to the centerline; and
the tubular outer shroud has a second sectional geometry when viewed in the plane perpendicular to the centerline, a second elongated portion of the second sectional geometry has a wavy shape when viewed in the plane perpendicular to the centerline, and the second elongated portion of the second sectional geometry overlaps and is circumferentially aligned with about the centerline the first elongated portion of the first sectional geometry.

* * * * *